(12) United States Patent
Wang et al.

(10) Patent No.: US 9,713,007 B2
(45) Date of Patent: Jul. 18, 2017

(54) NETWORK ACCESS METHOD AND APPARATUS

(71) Applicant: ZTE CORPORATION, Shenzhen, Guangdong Province (CN)

(72) Inventors: Xin Wang, Shenzhen (CN); Feng He, Shenzhen (CN); Jianxun Ai, Shenzhen (CN); Lifeng Han, Shenzhen (CN)

(73) Assignee: ZTE CORPORATION (CN)

( * ) Notice: Subject to any disclaimer, the term of this patent is extended or adjusted under 35 U.S.C. 154(b) by 353 days.

(21) Appl. No.: 14/394,432

(22) PCT Filed: May 8, 2013

(86) PCT No.: PCT/CN2013/075313
§ 371 (c)(1),
(2) Date: Oct. 14, 2014

(87) PCT Pub. No.: WO2013/166963
PCT Pub. Date: Nov. 14, 2013

(65) Prior Publication Data
US 2015/0078360 A1    Mar. 19, 2015

(30) Foreign Application Priority Data

May 9, 2012    (CN) .......................... 2012 1 0141479

(51) Int. Cl.
*H04W 12/08*    (2009.01)
*H04W 48/18*    (2009.01)
(Continued)

(52) U.S. Cl.
CPC ........... *H04W 12/08* (2013.01); *H04W 48/18* (2013.01); *H04W 84/12* (2013.01); *H04W 88/08* (2013.01); *H04W 36/14* (2013.01); *H04W 48/16* (2013.01)

(58) Field of Classification Search
CPC ..... H04W 12/08; H04W 84/12; H04W 88/08; H04W 48/18; H04W 36/14; H04W 48/16
See application file for complete search history.

(56) References Cited

U.S. PATENT DOCUMENTS

2005/0272465 A1    12/2005    Ahmavaara et al.
2008/0057912 A1    3/2008    Deprun
(Continued)

FOREIGN PATENT DOCUMENTS

CN    1765139 A    4/2006
CN    101835241 A    9/2010
(Continued)

OTHER PUBLICATIONS

Communication Pursuant to Article 94(3) EPC issued Jan. 21, 2016 in European Patent Application No. 13787130.7.
(Continued)

*Primary Examiner* — Thai Nguyen
(74) *Attorney, Agent, or Firm* — Plumsea Law Group, LLC

(57) ABSTRACT

The embodiment of the present invention discloses a network access method and apparatus. The method comprises: a UE receiving WLAN access auxiliary information sent by a 3GPP access network; according to the information, the UE measuring WLAN radio signal quality and performing an access judgment to obtain a judgment result; and the UE accessing to the WLAN according to the judgment result. The present invention can accelerate the access of the UE to the WLAN and enable the UE to acquire subsequent data joint transmission and/or services, thereby improving the user experience.

8 Claims, 5 Drawing Sheets

(51) Int. Cl.
*H04W 84/12* (2009.01)
*H04W 88/08* (2009.01)
H04W 48/16 (2009.01)
H04W 36/14 (2009.01)

(56) References Cited

U.S. PATENT DOCUMENTS

| | | |
|---|---|---|
| 2011/0299422 A1 | 12/2011 | Kim et al. |
| 2014/0064068 A1* | 3/2014 | Horn ............... H04W 28/0289 370/230 |
| 2014/0079022 A1* | 3/2014 | Wang ................ H04W 36/22 370/331 |

FOREIGN PATENT DOCUMENTS

| | | | |
|---|---|---|---|
| GB | 2475094 A | 11/2011 | |
| JP | 2005051661 A | 2/2005 | |
| WO | 2009045969 A2 | 4/2009 | |
| WO | 2009137718 A1 | 11/2009 | |

OTHER PUBLICATIONS

Japanese Office Action dated Oct. 6, 2015 in Japanese Patent Application No. 2015-504861.
International Search Report and Written Opinion issued Aug. 8, 2013 in PCT Application No. PCT/CN2013/075313.

* cited by examiner

NETWORK ACCESS METHOD AND APPARATUS

TECHNICAL FIELD

The present document relates to the field of communications, and in particular, to a network access method and apparatus.

BACKGROUND OF THE INVENTION

With the continuous evolution of wireless communication technologies and protocol standards, the mobile packet service has been developed tremendously, and the data throughput capacity of a single terminal is on the rise. Take the Long Term Evolution (referred to as LTE) system for example, the maximum downlink rate for data transfer supported in the 20M bandwidth is 100 Mbps; in the subsequent LTE Advanced system, the data transfer rate can be further enhanced, even up to 1 Gbps.

The expansive growth of terminal data traffic makes the existing network resources gradually inadequate, especially in the case the new generation of communication technologies (such as 3G, LTE) cannot widely cover the whole network, followed by a problem that the user demands for rate and flow cannot be met, the user experience becomes worse. How to prevent and change this situation is a matter that operators must take into account, on the one hand, it needs to accelerate new technology promotion and network deployment; on the other hand, it desires to be able to strengthen the existing networks and technologies to achieve the purpose of rapidly improving the network performance. As we all know, in addition to the wireless network technology provided in the 3$^{rd}$ Generation Partnership Project (referred to as 3GPP), the currently widely used Wireless Local Area Network (referred to as WLAN), particularly the WLAN based on IEEE802.11 standard has been widely used in hotspot access coverage in homes, enterprises and even the Internet. Among them, the technical specifications proposed by the WIFI Alliance is most widely used, thus the WIFI network in practice often equals to the WLAN based on the IEEE 802.11 standard.

On this premise, each operator and company have proposed to integrate the WLAN with the existing 3GPP access network, to achieve joint transmission, so as to achieve the purpose of offloading the load and improving the network performance. For example, in earlier versions of the standards, the 3GPP has developed the related 3GPP access network and WLAN Interworking protocols, the interworking architecture relies on that the operators have independent 3GPP access network and independent and complete WLAN, data flows of these two networks need to go through the 3GPP core network elements. There is also such as the network convergence solution, similar to the carrier aggregation, proposed by Intel, and in this integration architecture, the 3GPP and the WLAN are still two separate access networks, but the WLAN only exists as a data connection transmitted between the access network and the User Equipment (referred to as UE) in the existing 3GPP access network, and the main management of the access network for the UE and a part of the possible user data are transmitted in a connection based on the 3GPP access network. It can be seen that, no matter in which joint transmission scheme, the UE needs to respectively access to the two separate access networks: 3GPP and WLAN (a network element in a 3GPP access network and WLAN access point).

However, in the related art, since the UE needs to scan the WLAN frequency band to detect whether there is an available WLAN or not, it takes long time for said UE accessing to the WLAN (currently the time for said UE accessing to the 3GPP access network is millisecond, and the time for accessing to the WLAN is at the level of seconds), thus taking a long time for the UE residing in/connected to the 3GPP cell accessing to an available WLAN (said available WLAN specifically refers to the WLAN deployed by the operator who deploys the 3GPP access network, or the WLAN which can work with said 3GPP access network to execute services such as data joint transmission) and obtaining the subsequent data joint transmission and/or other services, thus the user experience is not good.

SUMMARY OF THE INVENTION

The embodiment of the present document provides a network access method and apparatus to at least solve the problem that, since the UE residing in/connected to the 3GPP cell needs to scan the WLAN frequency band to detect whether there is an available WLAN or not, it takes said UE a long time to access to said available WLAN and acquire the subsequent data joint transmission and/or other services, thus the user experience is not good.

The embodiment of the present document provides a network access method. The network access method in accordance to an embodiment of the present document comprises: a UE receiving a WLAN access auxiliary information transmitted by a 3GPP access network; said UE measuring WLAN radio signal quality based on said information and executing an access judgment to obtain a judgment result; said UE accessing to said WLAN according to said judgment result.

Preferably, said UE receives said information from said 3GPP access network, comprising: said UE receiving the information sent by said 3GPP access network via a system message or a dedicated signaling.

Preferably, said UE performs measurement and access judgment according to said WLAN access auxiliary information, comprising: said UE measuring said WLAN signal quality according to said WLAN access auxiliary information; said UE performing an access judgment according to said WLAN signal quality and said acquired WLAN access condition to obtain said judgment result.

Preferably, said WLAN access condition is configured by the network side for said UE or preset in said UE; said WLAN access condition is judged out by said UE after said UE performs comprehensively sorting according to acquired information items, wherein said information items comprise at least one of the following: WLAN's signal quality measurement result, WLAN's load information, priority of WLAN access point.

Preferably, said 3GPP access network comprises one of the following: LTE network, UMTS network, Global System for Mobile Communications (GSM) network.

Preferably, said information comprises at least one of the following: WLAN's Basic Service Set type, WLAN's Basic Service Set Identifier, WLAN's service set identifier, UE's scan type, ProbeDelay before sending a probing frame when said UE performs an active scanning, ChannelList detected when said UE scans said basic service set, MinChannelTime taken by said UE scanning each channel, MaxChannelTime taken by said UE scanning each channel, WLAN load information, Media Access Control address of said WLAN access point, and priority of said WLAN access point.

The embodiment of the present document provides a network access apparatus. The network access apparatus in accordance to the embodiment of the present document may be applied to the UE, comprising: a receiving module, configured to receive a WLAN access auxiliary information sent by a 3GPP access network; a processing module, configured to perform measurement and access judgment according to said WLAN access auxiliary information to obtain a judgment result; an accessing module, configured to access to the WLAN according to said judgment result.

Preferably, said receiving module comprises: a receiving sub-module, configured to receive information sent by said 3GPP access network via a system message or a dedicated signaling.

Preferably, said processing module comprises: a measuring sub-module, configured to measure said WLAN's signal quality according to said WLAN access auxiliary information; a judging sub-module, used to execute an access judgment in accordance with said WLAN's signal quality and said acquired WLAN access condition, to obtain said judgment result.

Preferably, said WLAN access condition is configured by said network side for said UE or preset by said UE; said WLAN access condition is judged out by said UE after said UE performs comprehensively sorting according to acquired information items, wherein said information items comprise at least one of the following: WLAN's signal quality measurement result, WLAN's load information, and priorities of said WLAN access points.

The embodiment of the present document provides said UE with information for accessing to said WLAN via said 3GPP access network, which can accelerate said UE accessing to said WLAN and acquiring subsequent data joint transmission and/or services, thus improving the user experience.

BRIEF DESCRIPTION OF THE DRAWINGS

The accompanying drawings described herein are used to provide a further understanding of the present document and constitute a part of this application, exemplary embodiments of the present document and their illustration are used to explain the present document and do not constitute an unduly limit of the present document. In the accompanying drawings.

PREFERRED EMBODIMENTS OF THE PRESENT DOCUMENT

In the following, the embodiments of the present document will be illustrated with reference to the accompanying drawings. It should be noted that, in the case of no conflict, the embodiments and features in the embodiments of the present application may be combined with each other.

The repeated data processing method in the following embodiments can be applied on a server, and said server may be dedicated to processing the repeated data, of course, also may be applied in a set of servers. Alternatively, it can be used as a module in the server and shared with servers executing other functions.

Figure 1:
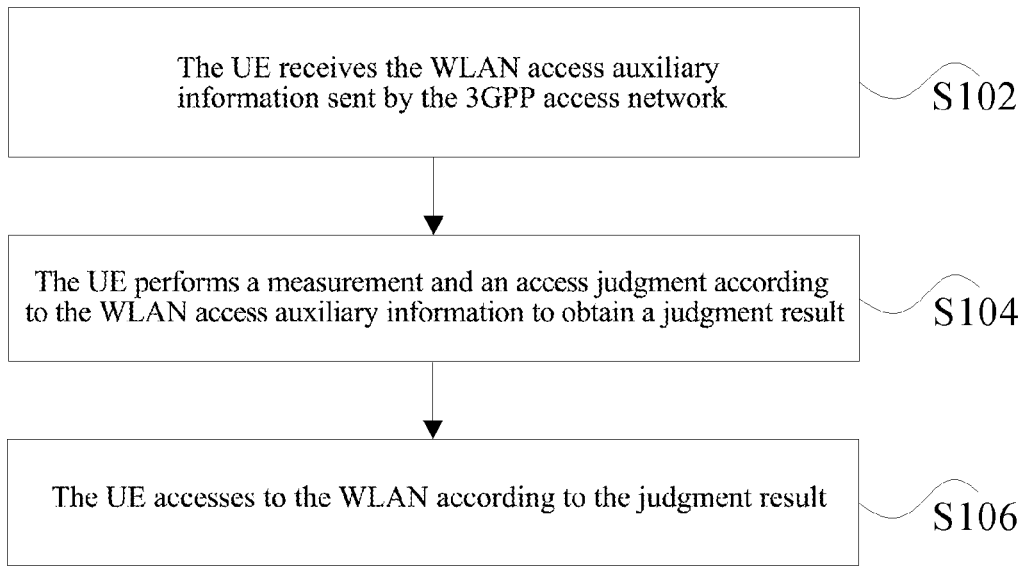
FIG. 1 is a flow chart of a network access method in accordance with an embodiment of the present document.

FIG. 1 is a flow chart of the network access method in accordance with an embodiment of the present document, as shown in FIG. 1, it comprises the following steps S102 to S104.

Step S102, said UE receives WLAN access auxiliary information sent by said 3GPP access network.

Step S104, said UE performs a measurement and access judgment based on said WLAN access auxiliary information to obtain a judgment result.

Step S106, said UE accesses to said WLAN according to said judgment result.

In the related art, since said UE residing in/connected to said 3GPP access network needs to scan the WLAN frequency band to detect whether there is an available WLAN or not, so that it takes said UE a long time to access to said available WLAN and obtain the subsequent data joint transmission and/or services, thus the user experience is not good. In the embodiment of the present document, said 3GPP access network provides said UE with said WLAN access auxiliary information for accessing to said WLAN, which can accelerate the UE accessing to said WLAN and obtaining the subsequent data joint transmission and/or services, thus improving the user experience.

It should be noted that the abovementioned information might be the information that can be used to reduce the time for said UE accessing to the WLAN (that is, information assisting said UE in rapidly accessing a specified WLAN).

It should be noted that, for the abovementioned information, said UE can receive via a system message or a dedicated signaling. Moreover, the abovementioned information comprises at least one of the following: WLAN's Basic Service Set Type (referred to as BSSType), WLAN's Basic Service Set Identifier (referred to as BSSID), WLAN's service set identifier (referred to as SSID), UE's ScanType, ProbeDelay before sending a probing frame when said UE performs an active scanning, ChannelList detected when said UE scans said basic service set, MinChannelTime taken by said UE scanning each channel, MaxChannelTime taken by said UE scanning each channel, WLAN's load information, Media Access control address of WLAN access point, and priority of WLAN access point.

The present document also provides two examples, and said examples describe the judging process before said UE accesses to said WLAN, and the specific description is as follows.

Example 1

Said UE measures said WLAN's signal quality according to the information; said UE reports the measurement result via the transmission link between the UE and the 3GPP access network; said UE receives from the 3GPP access network the instruction information used to indicate said UE to access to the WLAN. Wherein, said instruction information is sent after said 3GPP access network decides that said measurement result satisfies a certain measurement threshold, and this decision may simultaneously take the WLAN load condition and the priorities of the WLAN access points into account.

Example 2

Said UE measures the WLAN's signal quality according to the information; said UE determines that the optional information items such as the measurement result and the WLAN's load condition satisfy said WLAN access condition; said UE performs the operation of accessing to said WLAN. In this example, the UE directly determines and accesses to said WLAN, and its realization is simple and fast.

Furthermore, the abovementioned 3GPP access network comprises one of the following: LTE network, UMTS network, and GSM network. Moreover, the network element in said 3GPP access network may be a network element node in an access network using different 3GPP Radio Access Technology (referred to as RAT), for example, it refers to an Evolved Node B (referred to as eNB) in the LTE network, a Radio Network Controller (referred to as RNC) and Node B (collectively referred to as Radio Network Subsystem (RNS)) in the UMTS network, a Base Station Controller (referred to as BSC) and Base Transceiver Station (referred to as BTS) in the GSM network. It should be noted that, the abovementioned BSC and BTS can be collectively referred to a base station system (BSS).

The abovementioned embodiment avoids said user equipment from widely and aimlessly scanning and detecting WLAN full-band signal or initiating a connection attempt to a WLAN that is inappropriately to access (that is, a WLAN deployed by an operator which is not the same operator of said 3GPP access network), thus greatly saving the time required for said UE accessing to an adequate WLAN, and making the subsequent multi-network joint transmission executed more quickly.

The implementation process of the preferred embodiments of the present invention will be described in detail in the following.

First Preferred Embodiment

The first preferred embodiment describes that the 3GPP access network sends information through a system message, a UE initiates a measurement of the WLAN signal specified in said information when said UE has service requirements and performs an access judgment, and the UE accesses to said WLAN when said judgment result meets the WLAN access conditions.

Figure 2:
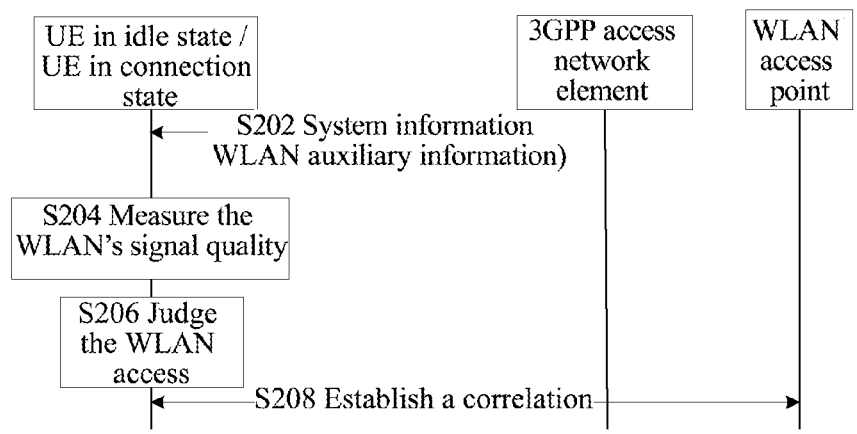
FIG. 2 is a flow chart of interaction in accordance with a first preferred embodiment of the present document.

FIG. 2 is a flow chart of interaction in accordance with the first preferred embodiment of the present document, as shown in FIG. 2, said UE is a multi-mode mobile phone supporting the 3GPP and WLAN functionalities, and according to the state that the UE is residing in/connected to the 3GPP cell, said UE may be divided into UE in idle state and UE in connected state; the wireless signal coverage area of said network elements in said 3GPP access network has the WLAN access point network elements (common station or pulled away) deployed by the same operator, the first preferred embodiment comprises the following steps S202 to S208.

Steps S202, the system message broadcasted by a network element in said 3GPP access network comprises the information used to assist said UE in rapidly accessing to the specified WLAN (corresponding to the WLAN access point in the drawing, and there may be more than one), such as the BSSID and ChannelList, and the system message can be received by the UE in idle state and the UE in connection state.

Step S204, both said UE in idle state and said UE in connection state may receive and read the system message being continuously broadcasted by the network element in said 3GPP access network, said UE may measure the WLAN signal indicated in the message when there are service requirements.

Step S206, said UE judges whether a certain WLAN access point network meets the WLAN access condition or not.

There are two methods for said UE acquiring said WLAN access condition: said UE itself may have preset a WLAN access condition (such as the WLAN's signal quality threshold); alternatively, this condition may also be sent by said access network side to said UE via a message, and said message may be a dedicated signaling or a system message, for example, it can be carried with said WLAN auxiliary information in S202 in the same system message to broadcast.

Specifically speaking, the setting of the WLAN accessing condition value can be a threshold identified only by the radio signal quality, or a result determined by comprehensively sorting and judging information combining of signal quality, the load condition of each WLAN access point network, and the priority of each WLAN access point. Wherein, the load condition of each WLAN access point network and the priority of each WLAN access point are optional information items that the network element in said 3GPP access network decides whether to send to said UE or not, and they can be carried in said WLAN auxiliary information or other wireless messages.

Step S208, the existing WLAN access procedure is used to establish a correlation between said UE and said WLAN access point.

The Second Preferred Embodiment

Figure 3:
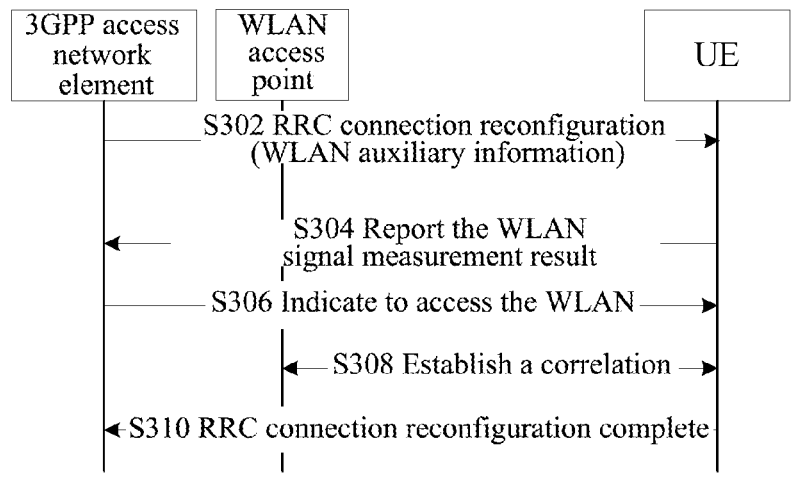
FIG. 3 is a flow chart of interaction of in accordance with a second preferred embodiment of the present document.

FIG. 3 is a flow chart of interaction in accordance with the second preferred embodiment of the present document, and as shown in FIG. 3, said UE is a multi-mode mobile phone already accessing to the 3GPP cell and supporting the 3GPP and WLAN functionalities; there are WLAN access point network elements within the radio signal coverage of a network element in said 3GPP access network. The second preferred embodiment of the present document comprises the following steps S302 to S310.

Step S302, when a network element in said 3GPP access network has needs such as data offload, said network element may send said UE the information assisting the UE in rapidly accessing to the specified WLAN via a dedicated signaling, such as the SSID, the ChannelList, and so on. Said dedicated signaling may be a radio resource control (RRC) message, such as a RRC Connection Reconfiguration message, or another newly added air interface message.

Step S304, after said UE receiving the message, it measures the WLAN signal indicated in said message and reports the measurement result to the network element in said 3GPP access network.

Step S306, if said measurement result meets a certain threshold, the network element in said 3GPP access network may indicate said UE to access to said WLAN after the judgment.

If there are more than one available WLAN networks, and said network element in said 3GPP access network already knows information such as the load condition of each WLAN, and the priority of each WLAN access point, said judgment may also be a result determined after said network element in said 3GPP access network comprehensively sorts and judges the abovementioned information, that is, said access network indicates the identifier of a WLAN with the optimal comprehensive condition to said UE to access.

Step S308, use the existing WLAN access procedure and establish a correlation between said UE and said WLAN access point.

Step S310, after the correlation is established successfully, said UE notifies said network element in said 3GPP access network of the information of accessing to the WLAN, and said information may be carried in the RRC Connection Reconfiguration Complete message, or another response message corresponding to the newly added air interface message in step S302.

The Third Preferred Embodiments

Figure 4:
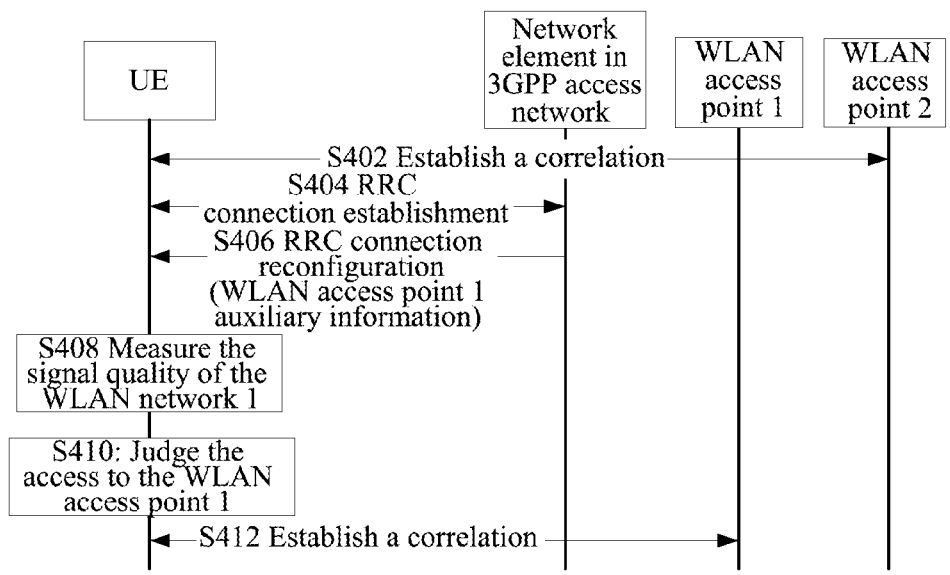
FIG. 4 is a flow chart of interaction in accordance with a third preferred embodiment of the present document.

FIG. 4 is a flow chart of interaction in accordance with the third preferred embodiment of the present document, as shown in FIG. 4, the WLAN access point 1 is a WLAN network in which a network element in said 3GPP access network can execute data offload, the WLAN access point 2 is a WLAN network in which a 3GPP access point network element cannot execute the data offload. The third preferred embodiment comprises the following steps S402 to S412.

Step S402, said UE finds out the WLAN access point 2 by scanning, establishes a correlation with said WLAN, accesses to said WLAN and perform a data transfer.

Step S404, said UE needs to establish a service connection in the 3GPP cell where it resides in due to upper-layer service requirements, and therefore, said UE establishes a connection bearer with said 3GPP access point network element through a normal RRC connection establishment process.

Step S406, when said network element in said 3GPP access network has needs such as data offload, said network element can send said UE the information, such as SSID and ChannelList, and so on, assisting said UE in rapidly accessing to the specified WLAN access point 1 through a dedicated signaling (such as the RRC Connection Reconfiguration message).

Step S408, after said UE receives said dedicated signaling, it measures said WLAN access point 1 signal indicated in the message.

Step S410, said UE determines that said measurement result meets said WLAN access condition; if said WLAN access auxiliary information carries (or said UE already knows through other messages) information such as the WLAN's load condition, said UE comprehensively judge based on the abovementioned information.

Clearly, similar information such as the WLAN's load condition and the priorities of the WLAN access points are more applicable to the case that there are more than one available WLAN networks (for example, both the WLAN access point 1 and the WLAN access point 3 are WLAN networks in which said network element in said 3GPP access network may execute data offload).

Step S412, according to the existing WLAN process, said UE switches and accesses from said WLAN access point 2 to said WLAN access point 1.

It should be noted that steps illustrated in the flow charts of the accompanying drawings may be implemented in a computer system in which there are a set of computer executable instructions, moreover, although the logic order is shown in the flow charts, in some cases, the steps shown or described herein may be executed in a different order.

Figure 5:
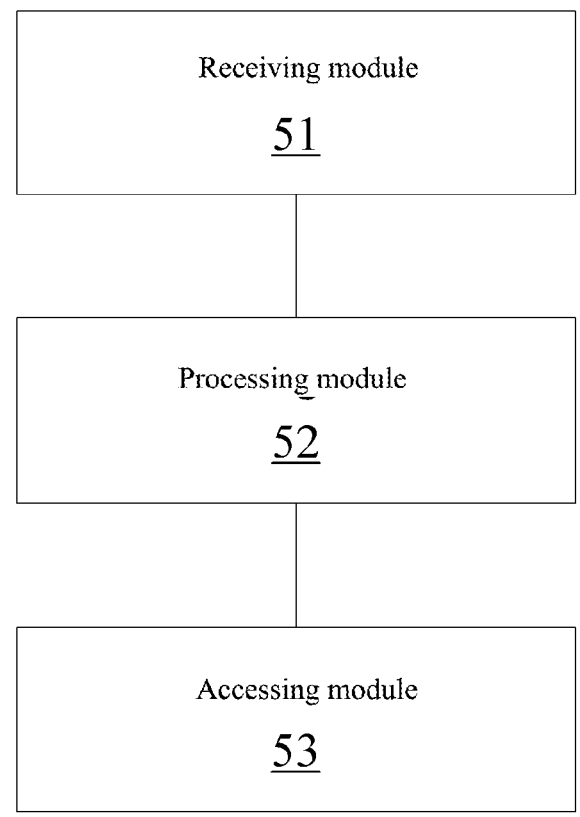
FIG. 5 is a structural block diagram of a network access apparatus in accordance with an embodiment of the present document.

The embodiment of the present document provides a network access apparatus, and said network access apparatus may be applied to the UE and used to implement the abovementioned network access method. FIG. 5 is a structural block diagram of the network access apparatus in accordance with an embodiment of the present document, and as shown in FIG. 5, it comprises receiving module 51, processing module 52 and access module 53, in the following, its structure will be described in detail.

Receiving module 51 is configured to receive the WLAN access auxiliary information sent by the 3GPP access network; processing module 52 is connected to receiving module 51 and is configured to measure and execute an access judgment in accordance with said WLAN access auxiliary information received by said receiving module 51, to obtain a judgment result; access module 53 is connected to processing module 52, and is configured to access to said WLAN according to the judgment result obtained by said processing module 52.

Figure 6:
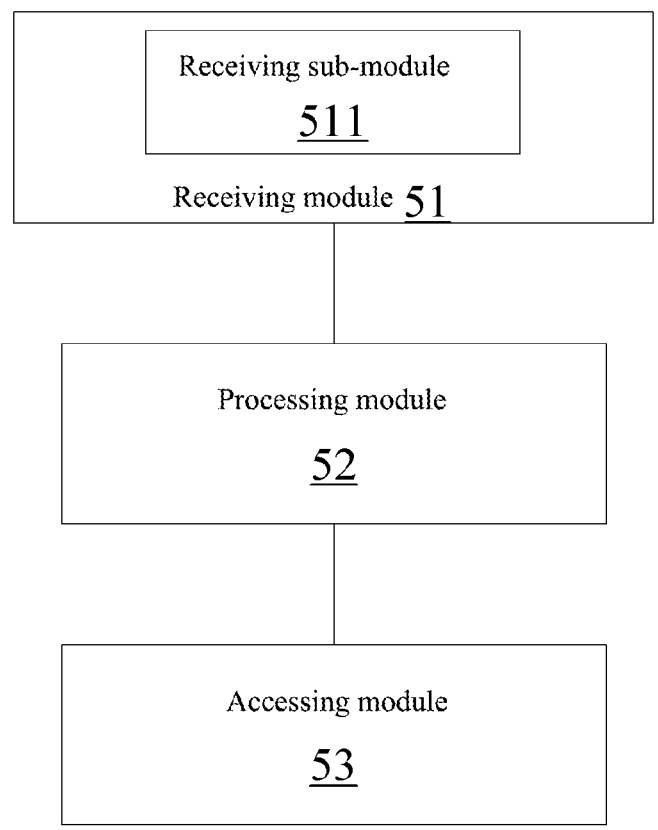
FIG. 6 is a first structural block diagram of a network access apparatus in accordance with a preferred embodiment of the present document.

FIG. 6 is a structural block diagram of the network access apparatus according to a preferred embodiment of the present document, as shown in FIG. 6, said receiving module 51 comprises: receiving sub-module 511, configured to receive information transmitted by said 3GPP access network through a system message or a dedicated signaling.

Figure 7:
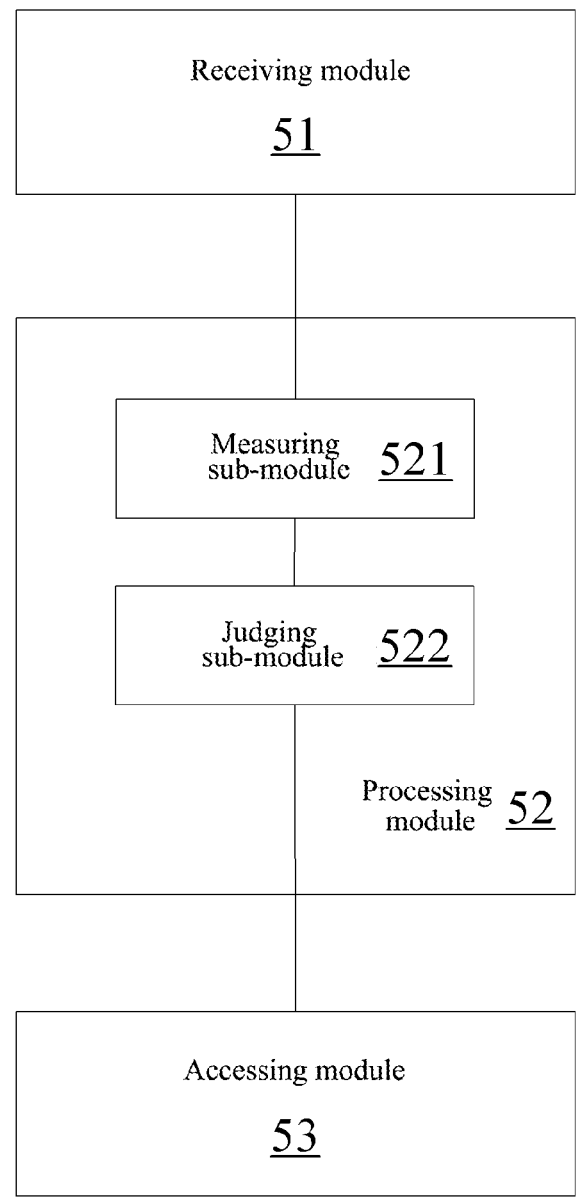
FIG. 7 is a second structural block diagram of a network access apparatus in accordance with a preferred embodiment of the present document.

FIG. 7 is a second structural block diagram of the network access apparatus according to a preferred embodiment of the present document, as shown in FIG. 7, processing module 52 comprises: measuring sub-module 521 and judging sub-module 522, in the following, their structures will be described in detail.

measuring sub-module 521 is configured to measure the WLAN's signal quality according to said WLAN access auxiliary information; judging sub-module 522 is connected to said measuring sub-module 521, and is configured to perform an access judgment according to said WLAN's signal quality measured and said WLAN access condition acquired by said measuring sub-module 521, to obtain a judgment result.

Preferably, said WLAN access condition is a signal quality threshold, and said threshold is configured by the network side for said UE or preset in said UE; said WLAN access condition is judged out by said UE after said UE performs comprehensively sorting according to the obtained information items, wherein said information items comprise at least one of: said WLAN's signal quality measurement result, said WLAN's load information, and the priorities of said WLAN access points.

It should be noted that, the network access apparatus described in the apparatus embodiment corresponds to the abovementioned method embodiment, its specific implementation process has been described in detail in said method embodiment and is not repeated herein.

To sum up, according to the abovementioned embodiments of the present document, a network access method and apparatus are provided. The embodiment of the present document provides said UE with said WLAN access auxiliary information for said UE accessing to said WLAN through said 3GPP access network, which may speed up said UE accessing to said WLAN and obtaining the subsequent data joint transmission and/or services, thus improving the user experience.

Obviously, those skilled in the art should understand that, each abovementioned module or step in the present document can be implemented with a general-purpose computing apparatus, they can be integrated on a single computing apparatus or distributed in a network composing of a plurality of computing apparatuses, alternatively, they may be implemented with program codes executable by a computing apparatus, thus they can be stored in a storage means and executed by a computing apparatus, or they are made into integrated circuit modules respectively, or some of modules or steps are made into a single integrated circuit module to implement. Thus, the present document is not limited to any specific combination of hardware and software.

The above description is only preferred embodiments of the present document and is not intended to limit the present document, and for a person skilled in the art, the present document may have various changes and modifications. Any modification, equivalent replacement and improvement made within the spirit and principle of the present document should be included within the protection scope of the present document.

INDUSTRIAL APPLICABILITY

The embodiment of the present document provides said UE with information for accessing to said WLAN via said 3GPP access network, which can accelerate said UE accessing to said WLAN and acquiring subsequent data joint transmission and/or services, thus improving the user experience.

What we claim is:

1. A network access method, comprising:
   a user equipment (UE) receiving wireless local access network (WLAN) access auxiliary information transmitted by a 3$^{rd}$ Generation Partnership Project (3GPP) access network;
   said UE performing a measurement and an access judgment based on said WLAN access auxiliary information and obtaining a judgment result;
   said UE accessing said WLAN according to said judgment result;
   wherein, said UE performing said measurement and access judgment according to said WLAN access auxiliary information comprises:
   said UE measuring said WLAN's signal quality according to said WLAN access auxiliary information;
   said UE performing an access judgment according to said WLAN's signal quality and acquired WLAN access condition to obtain said judgment result;
   wherein said WLAN access condition is configured by a network side for said UE or preset in said UE; said WLAN access condition is judged out by said UE after said UE performs comprehensively sorting according to acquired information items, wherein said information items comprise at least one of the following: WLAN's signal quality measurement result, WLAN's load information, priorities of WLAN access points.

2. The method of claim 1, wherein, said UE receiving said WLAN access auxiliary information from said 3GPP access network comprising: said UE receiving said WLAN access auxiliary information sent by said 3GPP access network via a system message or a dedicated signaling.

3. The method of claim 2, wherein, said 3GPP access network comprises one of the following: long term evolution (LTE) network, universal mobile telecommunications system (UMTS) network, global system for mobile communications (GSM) network.

4. The method of claim 2, wherein, said WLAN access auxiliary information comprises at least one of the following: said WLAN's Basic Service Set type, said WLAN's Basic Service Set Identifier, said WLAN's service set identifier, said UE's scan type, ProbeDelay before sending a probing frame when said UE performs an active scanning, ChannelList detected when said UE scans said basic service set, MinChannelTime taken by said UE scanning each channel, MaxChannelTime taken by said UE scanning each channel, WLAN load information, a Media Access Control address of said WLAN access point, and priorities of WLAN access points.

5. The method of claim 1, wherein, said 3GPP access network comprises one of the following: long term evolution (LTE) network, universal mobile telecommunications system (UMTS) network, global system for mobile communications (GSM) network.

6. The method of claim 1, wherein, said WLAN access auxiliary information comprises at least one of the following: said WLAN's Basic Service Set type, said WLAN's Basic Service Set Identifier, said WLAN's service set identifier, said UE's scan type, ProbeDelay before sending a probing frame when said UE performs an active scanning, ChannelList detected when said UE scans said basic service set, MinChannelTime taken by said UE scanning each channel, MaxChannelTime taken by said UE scanning each channel, WLAN load information, a Media Access Control address of said WLAN access point, and priorities of WLAN access points.

7. A network access apparatus, applied to a UE, comprising:
   a receiving module, configured to receive a WLAN access auxiliary information sent by a 3GPP access network;
   a processing module, configured to perform measurement and access judgment according to said WLAN access auxiliary information to obtain a judgment result; and
   an accessing module, configured to access said WLAN according to said judgment result;
   wherein, said processing module comprises:
   a measuring sub-module, configured to measure said WLAN's signal quality according to said WLAN access auxiliary information; and
   a judging sub-module, configured to execute an access judgment in accordance with said WLAN's signal quality and acquired WLAN access condition, to obtain said judgment result
   said WLAN access condition is configured by said network side for said UE or preset by said UE; said WLAN access condition is judged out by said UE after said UE performs comprehensively sorting according to acquired information items, wherein said information items comprise at least one of the following: WLAN's signal quality measurement result, WLAN's load information, and priorities of said WLAN access points.

8. The apparatus of claim 7, wherein, said receiving module comprises: a receiving sub-module, configured to receive said WLAN access auxiliary information sent by said 3GPP access network via a system message or a dedicated signaling.

* * * * *